US008897568B2

(12) United States Patent
Miyano

(10) Patent No.: US 8,897,568 B2
(45) Date of Patent: Nov. 25, 2014

(54) DEVICE AND METHOD THAT COMPARE FACIAL IMAGES

(75) Inventor: Hiroyoshi Miyano, Minato-ku (JP)

(73) Assignee: NEC Corporation, Tokyo (JP)

( * ) Notice: Subject to any disclaimer, the term of this patent is extended or adjusted under 35 U.S.C. 154(b) by 201 days.

(21) Appl. No.: 13/512,232

(22) PCT Filed: Oct. 8, 2010

(86) PCT No.: PCT/JP2010/067762
§ 371 (c)(1),
(2), (4) Date: May 25, 2012

(87) PCT Pub. No.: WO2011/065130
PCT Pub. Date: Jun. 3, 2011

(65) Prior Publication Data
US 2012/0269440 A1    Oct. 25, 2012

(30) Foreign Application Priority Data
Nov. 25, 2009  (JP) .................................. 2009-267767

(51) Int. Cl.
| *G06K 9/46* | (2006.01) |
| *G06K 9/00* | (2006.01) |
| *G06K 9/42* | (2006.01) |
| *G06T 7/00* | (2006.01) |

(52) U.S. Cl.
CPC .......... *G06T 7/0028* (2013.01); *G06K 9/00248* (2013.01); *G06T 2207/30201* (2013.01); *G06K 9/42* (2013.01)
USPC ........................................................ 382/190

(58) Field of Classification Search
None
See application file for complete search history.

(56) References Cited

U.S. PATENT DOCUMENTS

| 2009/0087036 A1 | 4/2009 | Imaoka |
| 2009/0220156 A1 | 9/2009 | Ito et al. |

FOREIGN PATENT DOCUMENTS

| JP | 11-161791 A | 6/1999 |
| JP | 2006-338092 A | 12/2006 |
| JP | 2007-316909 A | 12/2007 |
| JP | 2008-003749 A | 1/2008 |
| JP | 2009-211178 A | 9/2009 |

OTHER PUBLICATIONS

Matthew A. Turk, et al., "Face Recognition Using Eigenfaces", Proc. of IEEE CVPR, Jun. 1991, pp. 586-591.

(Continued)

*Primary Examiner* — Stephen R Koziol
*Assistant Examiner* — Amandeep Saini
(74) *Attorney, Agent, or Firm* — Sughrue Mion, PLLC

(57) ABSTRACT

A first normalizing means generates a first normalized image by performing a normalizing process with fixed aspect ratios on given facial images. A feature extracting means generates feature images including features to be used for comparing faces, from the first normalized image. A second normalizing means generates a second normalized image by performing a normalizing process with variable aspect ratios on the feature images. A first comparing means calculates a first comparing result as an index as to whether or not faces in two images belong to one person, using the feature images. A second comparing means calculates a second comparing result as an index as to whether or not the faces in the two images belong to one person, using the second normalized image. A judging means judges whether or not the faces in the two images belong to one person, based on the first and second comparing result.

10 Claims, 3 Drawing Sheets

(56) References Cited

OTHER PUBLICATIONS

Peter N. Bulhumeur, et al., "Eigenfaces vs. Fisherfaces: Recognition Using Class Specific Linear Projection", IEEE Trans. Pattern Anal. Machine Intell., Jul. 1997, pp. 711-720, vol. 19.

Akihiro Nakanowatari, et al., "Face Recognition that is Robust Against Pose and Illumination Changes", Panasonic Technical Journal, Jan. 2009, vol. 54, No. 4.

Takayuki Kurozumi, "Facial Individuality and Expression Analysis by Eigenspace Method and Multiple Discriminant Analysis", Master Thesis, School of Information Science, Japan Advanced Institute of Science and Technology, 1999, 4.

US 8,897,568 B2

DEVICE AND METHOD THAT COMPARE FACIAL IMAGES

CROSS REFERENCE TO RELATED APPLICATIONS

This application is a National Stage of International Application No. PCT/JP2010/067762 filed Oct. 8, 2010, claiming priority based on Japanese Patent Application No. 2009-267767, filed Nov. 25, 2009, the contents of all of which are incorporated herein by reference in their entirety.

TECHNICAL FIELD

The present invention relates to a technology for comparing faces through image processing.

BACKGROUND ART

There is a facial comparing technology for judging whether or not the persons represented by two images whose frontal facial images are captured are identical through image processing.

Usually, a facial comparison process begins with a normalizing process for uniformizing the positions and sizes of persons captured in respective two images in order to be able to compare the persons with each other. The facial comparison process then extracts facial features from the normalized images and compares the two images based on the extracted facial features. Existing facial comparison processes include PCA (Principal Component Analysis, Non-patent document 1) and LDA (Linear Discriminant Analysis, Non-patent document 2). The normalizing process for uniformizing the positions and sizes of faces captured in respective two images is very important for the facial comparison process according to the above processing sequence.

According to one normalizing method, the positions of left and right eyes are aligned by simply enlarging, reducing, and rotating images. According to another normalizing method, various parts of faces (hereinafter referred to as "facial parts"), such as left and right corners of eyes and mouths, and nostrils, are detected, and an affine transformation or a more complex linear transformation is carried out to minimize any positional misalignments of those facial parts.

The former normalizing method does not change aspect ratios and does not distort the shapes of the faces since the eyes are positionally aligned by simple enlargement, reduction, and rotation. The former normalizing method will hereinafter be referred to as "normalizing process with fixed aspect ratios". For example, Non-patent document 4 employs a normalizing process using the positions of eyes.

The latter normalizing method changes aspect ratios and distorts the shapes of the faces while an affine transformation or a complex linear transformation is carried out. The latter normalizing method will hereinafter be referred to as "normalizing process with variable aspect ratios". For example, in Non-patent document 3, a normalizing process is performed so as to make constant the positions of both eyes and the positions beneath the noses. Therefore, aspect ratios may be changed. Patent document 1 discloses a technology wherein the positions of feature points of faces in images to be compared are aligned with the positions of feature points of a standard facial image, after which the images are compared, and changes of the feature points are also used for facial comparison.

If the images of faces to be handled are captured obliquely, then frontal images recovered from the captured images can be used for a technology for comparing frontal facial images as described above (see Non-patent document 4).

RELATED ART LITERATURE

Patent Documents

Patent document 1: JP11-161791A

Non-Patent Documents

Non-patent document 1: M. A. Turk and A. P. Pentland, "Face recognition using eigenfaces," Proc. Of IEEE CVPR, pp. 586-591, June, 1991.

Non-patent document 2: P. N. Belhumeur, J. P. Hespanha, and D. J. Kregman, "Eigenfaces vs. Fisherfaces: Recognition using class specific linear projection," IEEE Trans. Pattern Anal. Machine Intell., Vol. 19, pp. 711-720, May 1997.

Non-patent document 3: Takayuki Kurozumi, "Facial Individuality and Expression Analysis by Eigenspace Method and Multiple Discriminant Analysis", Master thesis, School of Information Science, Japan Advanced Institute of Science and Technology, pp. 10-13, 1999.

Non-patent document 4: Akihiro Nakanowatari, Ryuji Yamazaki, Shin Yamada, and Atsushi Morimura, "Face Recognition that is Robust Against Pose and Illumination Changes", Panasonic Technical Journal Vol. 54. No. 4, 2009.

SUMMARY OF THE INVENTION

Problems to be Solved by the Invention

According to the normalizing process with fixed aspect ratios, there are cases wherein the positions of facial parts in two images to be compared are not aligned with each other, and cases wherein the performance of the facial comparison process is lowered due to a misalignment between the positions of the facial parts.

For example, even if two people, who have been compared with each other, are identical, the positions of facial parts tend to change due to facial expression changes and small posture changes. The persons who are identical to each other may be judged as different persons because of positional shifts of facial parts due to facial expression changes and small posture changes. On the other hand, even if the facial parts of two people have different shapes, the different shapes may not be recognized because of positional shifts of facial parts, and the persons may not be judged accurately.

FIG. 1 is a set of diagrams showing a specific example of image changes caused when the normalizing process with fixed aspect ratios is performed on two images. In this example, the facial image of person A and the facial image of person B are normalized. The normalization is performed to bring the left eyes into a position (Lx, Ly) and the right eights into a position (Rx, Ry) by image enlargement, reduction, and rotation. In the example shown in FIG. 1, the mouths of persons A, B are positionally different from each other. Therefore, it is not likely that the different shapes of their mouths will be reflected in the results of the facial comparison.

The normalizing process with variable aspect ratios absorbs changes in the positions of the facial parts which may be caused by changes in facial expressions. However, since the positions of the facial parts are corrected, the positional information of the facial parts cannot be used for facial comparison. The positional information of the facial parts that indicates that the distance between the eyes is greater than the distance between the eyes and the mouth, and that the face is long, for example, is not used. In addition, the normalizing process with variable aspect ratios causes the shapes of the faces to be distorted, resulting in a reduction in the performance of facial comparison.

According to Non-patent document 3, for example, the normalizing process is performed such that the positions of both eyes and the position beneath the nose will have prescribed coordinates. For example, a face having eyes widely spaced from each other and in which the distance between the positions of the eyes and the position beneath the nose is short is converted into a face which is longer than it actually is by the normalizing process. Though the normalizing process with variable aspect ratios makes it easy to compare facial parts with each other, it loses the information that the face is not long.

FIG. 2 is a set of diagrams showing a specific example of image changes caused when the normalizing process with variable aspect ratios is performed on two images. In this example, the facial image of person A and the facial image of person B are also normalized. The normalization is performed to bring the left eyes into a position (Lx, Ly) and the right eights into a position (Rx, Ry), and also to bring the mouth into a position (Mx, My). In the example shown in FIG. 2, the mouths of persons A, B are positionally aligned with each other. Therefore, the different shapes of their mouths are reflected in the results of the facial comparison. However, the ratio of the distance between both eyes and the distance between the eyes and the mouth is not reflected in the results of the facial comparison. The normalization possibly causes a distortion in the shapes of the mouths, for example, which tends to lower the performance of the facial comparison.

The technology disclosed in Patent document 1 compares images that have been normalized by displacing feature points and uses the distances in which the feature points are displaced for a facial comparison process. Though both the shapes of facial parts and positional relationship between facial parts are reflected in the facial comparison process, no comparison is performed on images with fixed aspect ratios, which are close to the original images. If the distances in which feature points, e.g., the positions of mouths, are displaced are large, then since facial parts such as mouths cannot be compared with each other in a distortion-free manner, the performance of the facial comparison process is lowered.

It is an object of the present invention to provide a technology for performing a facial comparison process which appropriately reflects the layout of facial parts and the shapes of facial parts.

To achieve the above object, a facial image comparing apparatus according to the present invention comprises:

first normalizing means for generating a first normalized image by performing a normalizing process with fixed aspect ratios on given facial images;

feature extracting means for generating feature images including features to be used for comparing faces, from said first normalized image generated by said first normalizing means;

second normalizing means for generating a second normalized image by performing a normalizing process with variable aspect ratios on said feature images generated by said feature extracting means;

first comparing means for calculating a first comparing result as an index as to whether or not faces in two images belong to one person, using said feature images generated by said feature extracting means;

second comparing means for calculating a second comparing result as an index as to whether or not the faces in the two images belong to one person, using said second normalized image generated by said second normalizing means; and judging means for judging whether or not the faces in the two images belong to one person, based on said first comparing result calculated by said first comparing means and said second comparing result calculated by said second comparing means.

According to the present invention, a facial image comparing method according to the present invention comprises:

first normalizing means generates a first normalized image by performing a normalizing process with fixed aspect ratios on given facial images;

feature extracting means generates feature images including features to be used for comparing faces, from said first normalized image generated by said first normalizing means;

second normalizing means generates a second normalized image by performing a normalizing process with variable aspect ratios on said feature images generated by said feature extracting means;

first comparing means calculates a first comparing result as an index as to whether or not faces in two images belong to one person, using said feature images generated by said feature extracting means;

second comparing means calculates a second comparing result as an index as to whether or not the faces in the two images belong to one person, using said second normalized image generated by said second normalizing means; and judging means judges whether or not the faces in the two images belong to one person, based on said first comparing result calculated by said first comparing means and said second comparing result calculated by said second comparing means.

According to the present invention, a facial image comparing program according to the present invention enables a computer to perform the steps of:

generating a first normalized image by performing a normalizing process with fixed aspect ratios on given facial images;

generating feature images including features to be used for comparing faces, from said first normalized image;

generating a second normalized image by performing a normalizing process with variable aspect ratios on said feature images;

calculating a first comparing result as an index as to whether or not faces in two images belong to one person, using said feature images;

calculating a second comparing result as an index as to whether or not the faces in the two images belong to one person, using said second normalized image; and judging whether or not the faces in the two images belong to one person, based on said first comparing result and said second comparing result.

EXEMPLARY EMBODIMENTS

Next, with reference to the accompanying drawings, exemplary embodiments will be described.

Figure 3:
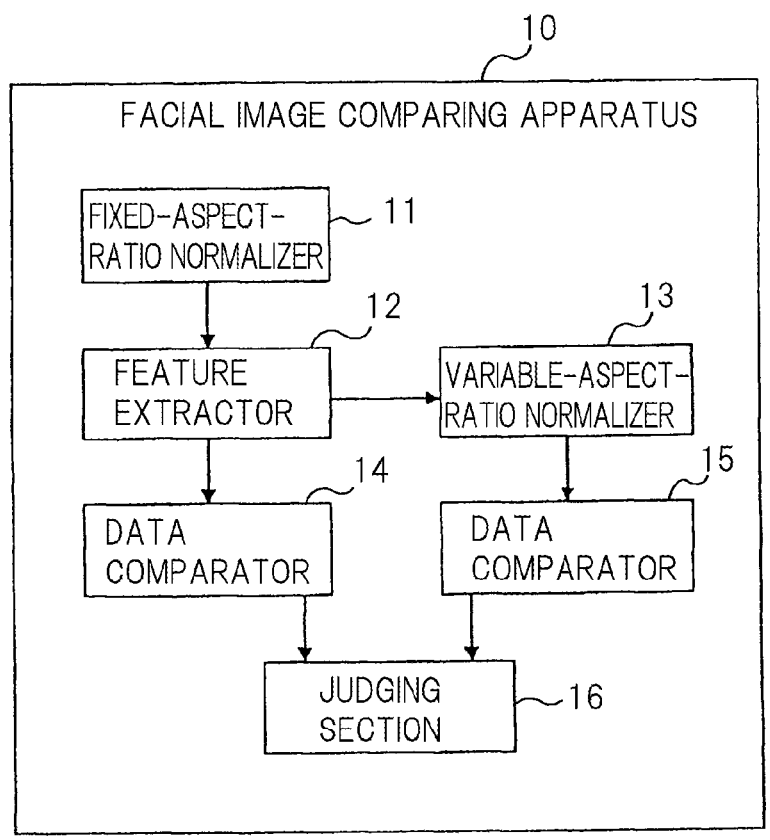
FIG. 3 is a block diagram showing the configuration of a facial image comparing apparatus according to an exemplary embodiment of the present invention.

FIG. 3 is a block diagram showing the configuration of a facial image comparing apparatus according to an exemplary embodiment of the present invention. As shown in FIG. 3, facial image comparing apparatus 10 includes fixed-aspect-ratio normalizer 11, feature extractor 12, variable-aspect-ratio normalizer 13, data comparators 14, 15, and judging section 16.

Fixed-aspect-ratio normalizer 11 performs a normalizing process with fixed aspect ratios on facial images supplied from a communication link, a storage medium, an internal memory, or the like based on a combination of enlargement, reduction, and rotation, thereby generating normalized images with fixed aspect ratios.

Input images may be facial images generated by the user who designates and clips facial areas. Alternatively, facial images detected from images including faces according to image processing may be used as input images. One method for detecting a facial image according to image processing is described in the document: P. Viola and M. Jones, "Rapid Object Detection using a Boosted Cascade of Simple Features", Computer Vision and Pattern Recognition, 2001, for example.

It is assumed by way of example that persons represented by two facial images that are input are compared. Fixed-aspect-ratio normalizer 11 performs the normalizing process with fixed aspect ratios on the two facial images. One of the facial images may be regarded as a standard image and registered after it has been processed in advance by a normalizing process and a feature extracting process, and a facial image to be compared against the standard image may subsequently be input.

Figure 1:
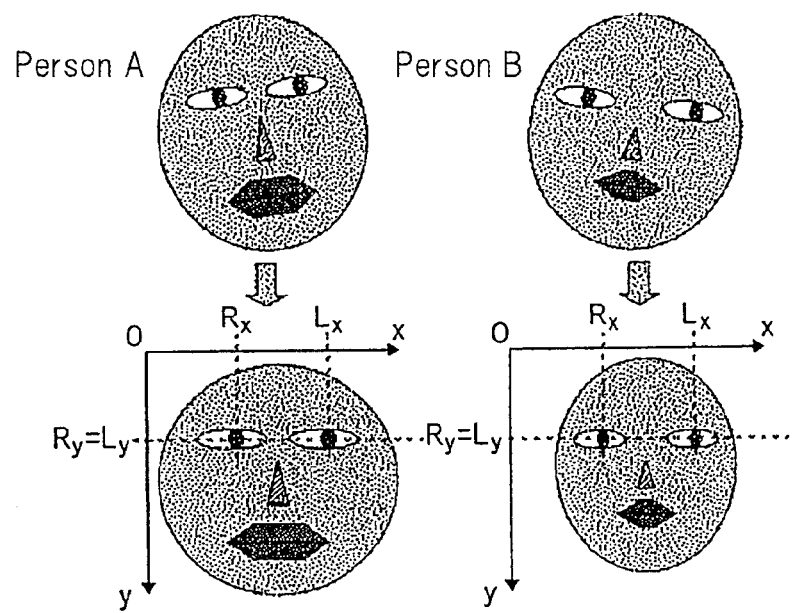
FIG. 1 is a set of diagrams showing a specific example of image changes caused when a normalizing process with fixed aspect ratios is performed on two images.
Figure 2:
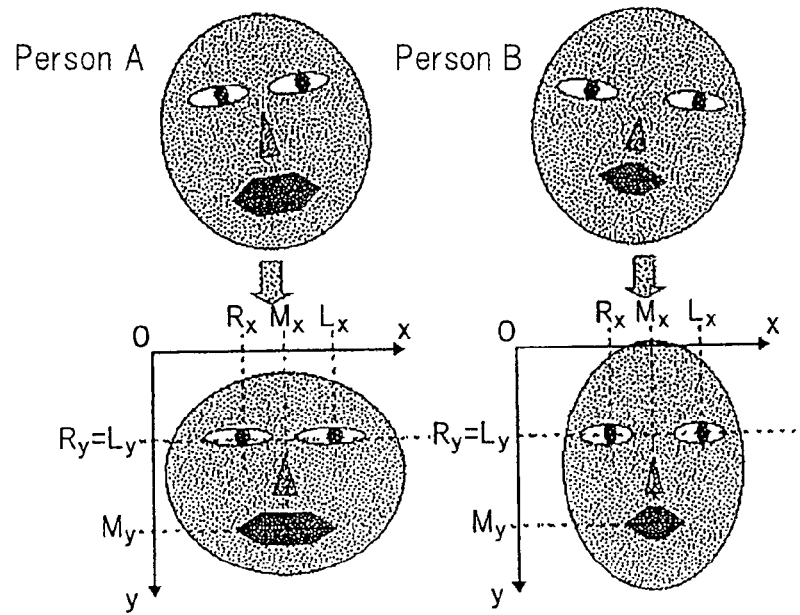
FIG. 2 is a set of diagrams showing a specific example of image changes caused when a normalizing process with variable aspect ratios is performed on two images.

Fixed-aspect-ratio normalizer 11 may rotate and enlarge or reduce the facial images in order to bring the left eyes into a position (Lx, Ly) and the right eights into a position (Rx, Ry) as shown in FIG. 1, for example.

It is assumed that the pixel value of a coordinate (x, y) in a normalized image that is generated by normalizing one of the facial images is represented by f1(x , y), and the pixel value of a coordinate (x, y) in a normalized image that is generated by normalizing the other facial image is represented by f2(x , y). The pixel values may be monochromatic gradation values or color RGB values.

Feature extractor 12 extracts features for use in comparing faces from the normalized images with fixed aspect ratios that have been generated by fixed-aspect-ratio normalizer 11, and generates feature images represented by the extracted features.

Feature extractor 12 calculates images g1(x , y), g2(x , y) made up of features that are useful in the facial images, from respective pixel values f1(x , y), f2(x , y) of the two facial images that have been normalized by fixed-aspect-ratio normalizer 11. Various calculating methods are available for calculating features and facial images, and any of those calculating methods may be used.

For example, if the input images are monochromatic images, then the original facial images may be convoluted using predetermined K Gabor filters Gi (I=1, . . . , K) according to a method called Gaborface, and feature images may be made up of Gabor features represented by the convoluted images. Such a method can specifically be indicated by equations (1), (2) shown below. In the equations, the symbol "*" represents an operator indicative of a convolutional operation. The Gaborface method is described in the document: P. Yang, S. Shan, W. Gaos, S. Li, and D. Zhang, "Face Recognition Using Ada-Boosted Gabor Features", Proceeding of the 6th IEEE International Conference on Automatic Face and Gesture Recognition, pp. 356-361, 2004.

$$g1(x,y)=[(G1*f1)(x,y),(G2*f1)(x,y),,,(Gk*f1)(x,y)] \quad (1)$$

$$g2(x,y)=[(G1*f2)(x,y),(G2*f2)(x,y),,,(Gk*f2)(x,y)] \quad (2)$$

If the input images are color images, then the above process may be performed after the input images are converted into monochromatic images, or alternatively, the above process may be performed on each of the three primaries, and the feature images may be expressed as vectors having three-fold sizes.

Feature images may be calculated using other convoluting methods than Gaborface. Furthermore, the input images may be used directly as feature images. If the input images are used directly as feature images, then the feature images are represented by the following equations (3), (4):

$$g1(x,y)=f1(x,y) \quad (3)$$

$$g2(x,y)=f2(x,y) \quad (4)$$

According to another method, the direction of a luminance gradient in an image is calculated and a histogram of the direction is calculated at each position and may be used as features. A method for using the histogram of the direction of the gradient is described in the document: N. Dalal and B. Triggs, "Histograms of Oriented Gradient for Human Detection", Computer Vision and Pattern Recognition, 2005.

Variable-aspect-ratio normalizer 13 performs a normalizing process with variable aspect ratios on the feature images generated by feature extractor 12, thereby generates normalized images with variable aspect ratios. At this time, variable-aspect-ratio normalizer 13 changes the aspect ratios of two feature images g1(x , y), g2(x , y) in order to align the positions of three or more facial parts including eyes, noses, and mouths to distort the shapes of the faces for positional alignment.

For example, variable-aspect-ratio normalizer 13 calculates affine transformation parameters to minimize square errors of the positions of the facial parts to be positionally aligned, and transforms the images according to an affine transformation. More specifically, variable-aspect-ratio normalizer 13 estimates affine transformation parameters to minimize the square errors of the positions for bringing the left and right eyes into respective positions (Lx, Ly), (Rx, Ry) and for bringing the mouths into a position (Mx, My), and converts the images using the affine transformation parameters.

Rather than the affine transformation which is a linear transformation, a higher-order transformation may be used. Moreover, an image may be divided into a plurality of areas, and each of the areas may be transformed.

Facial parts may be both corners of mouths, areas beneath noses, nostrils, ears, and both corners of eyes, in addition to eyes and mouths. The positions of the facial parts in images may be preset by the user who visually confirms the input images, or may be set when facial parts are detected according to image processing. An image processing method described in the above document: P. Viola and M. Jones, "Rapid Object Detection using a Boosted Cascade of Simple Features", Computer Vision and Pattern Recognition, 2001 may be applied to facial parts, rather than faces.

Data comparator 14 calculates a comparing score with fixed aspect ratios as an index as to whether or not the faces in the two images belong to one person, using the feature images generated by feature extractor 12.

Data comparator 15 calculates a comparing score with variable aspect ratios as an index as to whether or not the faces in the two images belong to one person, using the normalized images with variable aspect ratios which are generated by variable-aspect-ratio normalizer 13.

Data comparators 14, 15 may employ various methods for calculating comparing scores. For example, they may employ a method using PCA or LDA. According to a method using PCA or LDA, data comparators 14, 15 may determine a partial space in a feature space according to PCA or LDA, project the features of the two images onto the partial space, and may use the distance between two projected features or the normalized correlated values of the two projected features as the value of a comparing score. PCA is described in Non-patent document 1, and LDA in Non-patent document 2.

Judging section 16 judges whether or not the faces in the two images belong to one person, based on the comparing score with fixed aspect ratios that is calculated by data comparator 14 and the comparing score with variable aspect ratios that is calculated by data comparator 15. Various methods are available for determining whether or not persons represented by two images are identical based on two comparing scores.

According to one specific example, judging section 16 may calculate an average value of the two comparing scores obtained by data comparators 14, 15, and may decide that the persons are identical if the average value is greater than a predetermined threshold value and may decide that the persons are not identical if the average value is equal to or smaller than the predetermined threshold value. Alternatively, depending on how the comparing scores are calculated, judging section 16 may decide that the persons are identical if the average value is smaller than a predetermined threshold value and may decide that the persons are not identical if the average value is equal to or greater than the predetermined threshold value.

According to another example, judging section 16 may use a maximum value or a minimum value instead of the average value. According to still another example, judging section 16 may use the value of a weighted linear sum which is calculated using a predetermined weighting value.

The final judgment made by judging section 16 may be displayed as a text on a display, for example. A buzzer sound may be produced if judging section 16 decides that the persons are not identical. Different sounds may be produced when judging section 16 decides that the persons are identical and when judging section 16 decides that the persons are not identical.

Figure 4:
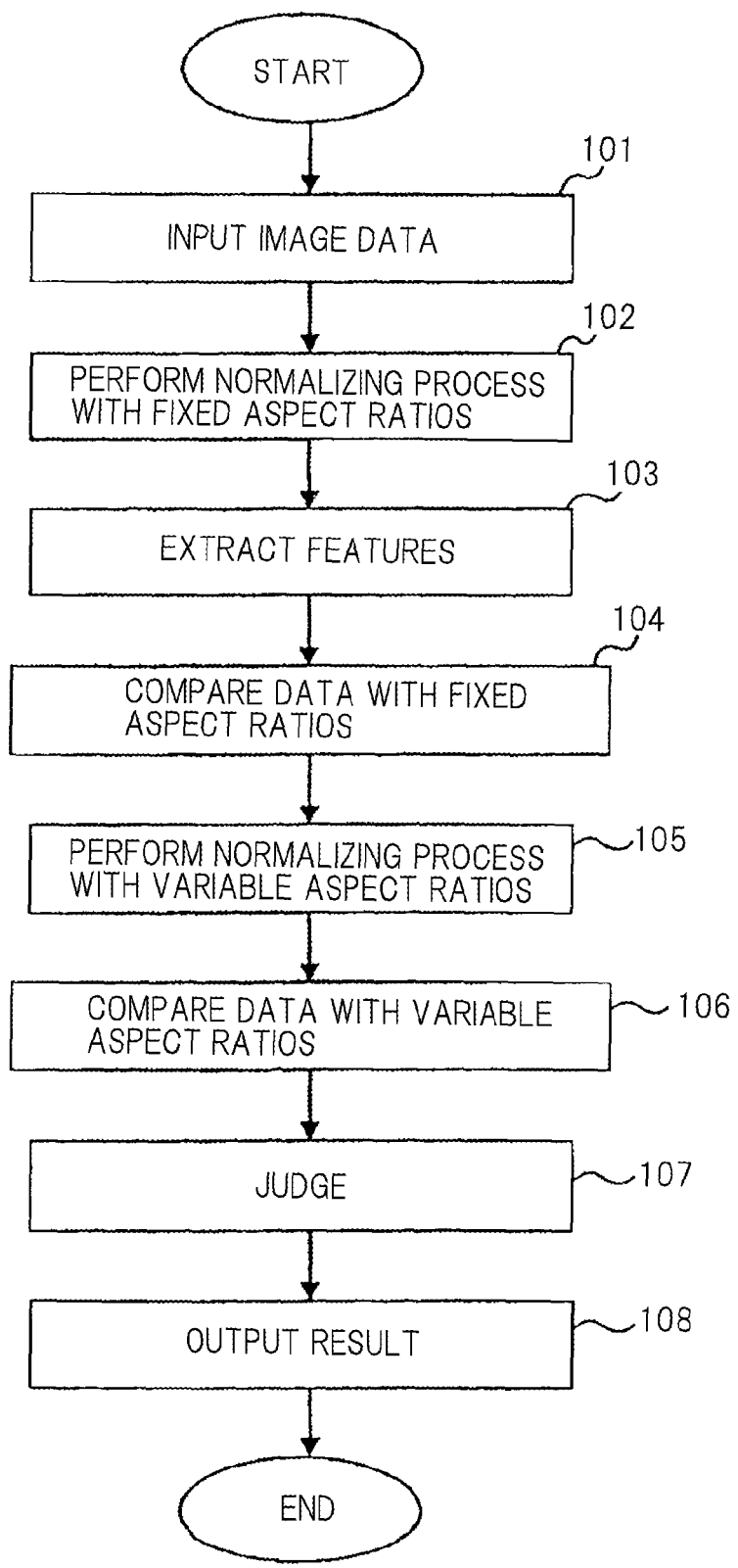
FIG. 4 is a flowchart of an operation sequence of the facial image comparing apparatus according to the exemplary embodiment.

FIG. 4 is a flowchart of an operation sequence of the facial image comparing apparatus according to the present exemplary embodiment. When two facial images to be compared are input (step 101), fixed-aspect-ratio normalizer 11 performs a normalizing process with fixed aspect ratios on the facial images (step 102), and generates two facial images represented respectively by f1(x , y), f2(x , y).

Then, feature extractor 12 extracts facial features from two facial images f1(x , y), f2(x , y) which have been normalized by fixed-aspect-ratio normalizer 11 (step 103), and generates feature images g1(x , y), g2(x , y).

Then, data comparator 14 performs a comparison process on two feature images g1(x , y), g2(x , y) produced by feature extractor 12 (step 104), and calculates a comparing score value a as an index as to whether or not the persons represented by the two images are identical, from the images normalized with fixed aspect ratios. If the comparison process is based on LDA, for example, then data g1, g2 are projected onto a low-order space determined according to LDA, the distance between the projected data is calculated, and the value of the distance is used as a score value.

Then, variable-aspect-ratio normalizer 13 performs a normalizing process with variable aspect ratios to align the positions of facial parts, on each of feature images g1(x , y), g2(x , y) generated by feature extractor 12 (step 105), and generates images h1(x , y), h2(x , y) normalized with variable aspect ratios.

Then, data comparator 15 performs a comparison process on data h1(x , y), h2(x , y) generated by variable-aspect-ratio normalizer 13 (step 106), and calculates a comparing score value b as an index as to whether or not the persons represented by the two images are identical, from the images normalized with variable aspect ratios. If the comparison process is based on LDA, for example, then data h1, h2 are projected onto a low-order space determined according to LDA, the distance between the projected data is calculated, and the value of the distance is used as a score value.

Then, judging section 16 calculates comparing score value m by combining two comparing score values a, b calculated respectively by data comparator 14 and data comparator 15, judges whether or not the persons represented by the two images are identical based on comparing score value m (step 107), and outputs the judgment (step 108). For example, judging section 16 may judge whether or not comparing score value m is greater than predetermined threshold value c.

Comparing score value m may be calculated as m=a+b, for example. Alternatively, comparing score value m may be calculated as m=max(a, b) or m=min(a, b). Further alternatively, comparing score value m may be calculated as the value of a weighted linear sum of weighted a and b.

If data comparators 14, 15 calculate distances calculated according to LDA as comparing scores, then the persons are more likely to be identical since the comparing scores are smaller. In this case, the persons may be judged as being identical if comparing score value m calculated as m=a+b is smaller than predetermined threshold value c, and may be judged as not being identical if comparing score value m is equal to or greater than predetermined threshold value c.

According to the present exemplary embodiment, as described above, it is judged whether or not the persons represented by two facial images are identical, using both the result of the comparison process based on an image normalized with fixed aspect ratios and the result of the comparison process based on an image normalized with variable aspect ratios. Therefore, it is possible to perform a facial comparison process which appropriately reflects the layout of facial parts and the shapes of facial parts.

According to the present exemplary embodiment, the normalizing process with fixed aspect ratios is initially performed, and then features are extracted before the normalizing process with variable aspect ratios is performed. Therefore, the amount of calculations is made smaller than if two normalizing processes are simply performed separately.

According to the present exemplary embodiment, furthermore, the normalizing process with fixed aspect ratios is initially performed, then features are extracted to generate feature images before the normalizing process with variable aspect ratios is performed, after which the normalizing process with variable aspect ratios is performed on the feature images. Consequently, even after the normalizing process with variable aspect ratios has been performed, since the feature quantities of facial parts are extracted from the images prior to the normalizing process with variable aspect ratios, the feature quantities are not affected by the distortion, resulting in a highly accurate comparison process.

Facial image comparing apparatus 10 according to the present exemplary embodiment can be implemented by a computer which executes a software program representative of processing sequences of various components of the apparatus.

The present invention has been described above in reference to the exemplary embodiment. However, the present invention is not limited to the above exemplary embodiment. Rather, the configuration of some of the exemplary embodiments may be modified within the scope of the technical concept of the present invention.

The present application is based upon and claims the benefit of priority from Japanese patent application No. 2009-267767, filed on Nov. 25, 2009, the disclosure of which is incorporated herein in its entirety by reference.

The invention claimed is:

1. A facial image comparing apparatus comprising:
   fixed-aspect-ratio normalizer that generates a first normalized image by performing a normalizing process with fixed aspect ratios on given facial images;
   feature extractor that generates feature images including features to be used for comparing faces, from said first normalized image generated by said fixed-aspect-ratio normalizer;
   variable-aspect-ratio normalizer that generates a second normalized image by performing a normalizing process with variable aspect ratios on said feature images generated by said feature extractor;
   first data comparator that calculates a first comparing result as an index as to whether or not faces in two images belong to one person, using said feature images generated by said feature extractor;
   second data comparator that calculates a second comparing result as an index as to whether or not the faces in the two images belong to one person, using said second normalized image generated by said variable-aspect-ratio normalizer; and
   judging section that judges whether or not the faces in the two images belong to one person, based on said first comparing result calculated by said first data comparator and said second comparing result calculated by said second data comparator.

2. The facial image comparing apparatus according to claim 1, wherein said normalizing process with fixed aspect ratios performed by said fixed-aspect-ratio normalizer comprises a process of aligning two positions with a reference position by enlarging or reducing and rotating said facial images.

3. The facial image comparing apparatus according to claim 1, wherein said normalizing process with variable aspect ratios performed by said variable-aspect-ratio normalizer comprises an affine transformation for minimizing square errors with respect to deviations between three or more positions and the standard position.

4. The facial image comparing apparatus according to claim 1, wherein said normalizing process with fixed aspect ratios performed by said fixed-aspect-ratio normalizer comprises a process of aligning the positions of both eyes with prescribed reference positions.

5. The facial image comparing apparatus according to claim 1, wherein said normalizing process with variable aspect ratios performed by said variable-aspect-ratio normalizer comprises a process of aligning the positions of both eyes and mouths with prescribed reference positions.

6. The facial image comparing apparatus according to claim 1, wherein said feature extractor generates feature images having Gabor features.

7. The facial image comparing apparatus according to claim 1, wherein said feature extractor generates feature images having a histogram of a luminance gradient as features.

8. The facial image comparing apparatus according to claim 1, wherein at least one of said first data comparator and said second data comparator projects the values of features of the two images onto a partial space, and uses the distance between features in the partial space as a comparing score representative of the comparing result.

9. A facial image comparing method comprising:
   generating, with a fixed-aspect-ratio normalizer, a first normalized image by performing a normalizing process with fixed aspect ratios on given facial images;
   generating, with a feature extractor, feature images including features to be used for comparing faces, from said first normalized image generated by said fixed-aspect-ratio normalizer,
   generating, with variable-aspect-ratio normalizer, a second normalized image by performing a normalizing process with variable aspect ratios on said feature images generated by said feature extracting extractor;
   calculating, with a first data comparator, a first comparing result as an index as to whether or not faces in two images belong to one person, using said feature images generated by said feature extracting means extractor;
   calculating, with a second data comparator, a second comparing result as an index as to whether or not the faces in the two images belong to one person, using said second normalized image generated by said variable-aspect-ratio normalizer; and
   judging, with a judging section, whether or not the faces in the two images belong to one person, based on said first comparing result calculated by said first data comparator and said second comparing result calculated by said second data comparator.

10. A non-transitory computer readable medium having recorded thereon a computer program for executing a method of comparing a facial image, the method comprising:
   generating a first normalized image by performing a normalizing process with fixed aspect ratios on given facial images;
   generating feature images including features to be used for comparing faces, from said first normalized image;
   generating a second normalized image by performing a normalizing process with variable aspect ratios on said feature images;
   calculating a first comparing result as an index as to whether or not faces in two images belong to one person, using said feature images;
   calculating a second comparing result as an index as to whether or not the faces in the two images belong to one person, using said second normalized image; and
   judging whether or not the faces in the two images belong to one person, based on said first comparing result and said second comparing result.

* * * * *